J. W. THOMPSON.
Church.
No. 81,842.
Patented Sept. 1, 1868.
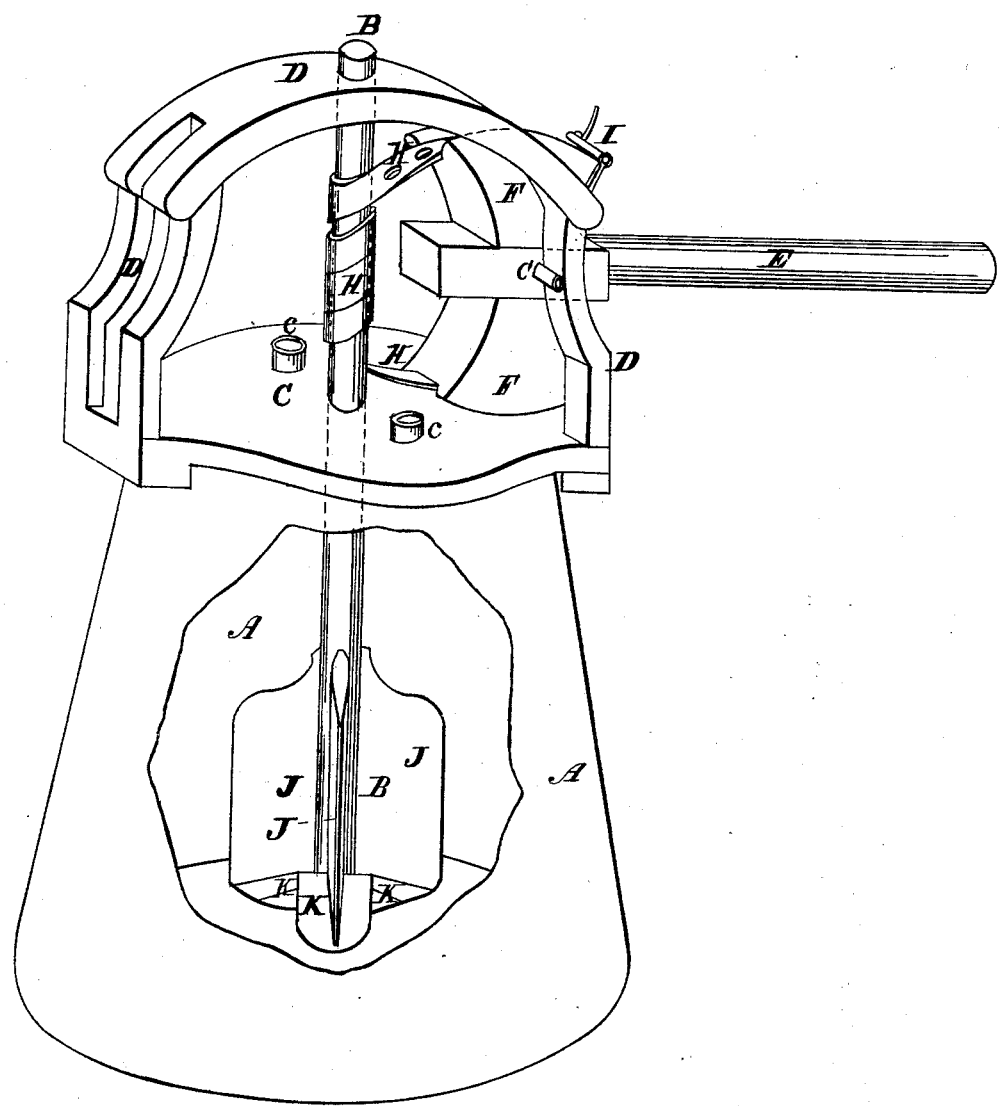

United States Patent Office.

J. W. THOMPSON, OF BUREAU JUNCTION, ILLINOIS.

Letters Patent No. 81,842, dated September 1, 1868.

IMPROVEMENT IN CHURN.

The Schedule referred to in these Letters Patent and making part of the same.

TO ALL WHOM IT MAY CONCERN:

Be it known that I, J. W. THOMPSON, of Bureau Junction, in the county of Bureau, and State of Illinois, have invented a new and improved Churn; and I do hereby declare that the following is a full, clear, and exact description of the construction and operation of the same, reference being had to the annexed drawings, making a part of this specification, in which—

My invention is represented by a perspective view, a portion of the side wall of the churn being broken away to show the interior.

This invention relates to that class of churns in which the dasher has four motions, viz, up, down, r ght, and left, and consists in effecting such motions by means of a new and greatly-simplified device, which can be attached to any churn at a trifling expense, and which is convenient and easy of operation.

In the drawings, A A represent the walls of a common upright churn, the dasher of which is shown at B. C is the cover of the churn, provided with ventilators $c$ $c$, and having attached to it an arched frame, D, which supports and guides the dasher-shaft, and also supports the operating-lever.

The object of the invention is to give the dasher B a vertically-reciprocating motion, and at the same time, while it is moving upward, to cause it to turn on its vertical axis in one direction, and, when it moves downward, to reverse the axial motion. This object is effected by a lever, E, which is attached to a wheel, or segment of a wheel, F, and, as the handle of the lever is vibrated up and down, rocks the segment upon a pin, G, which forms the fulcrum of the lever, and the journal or spindle of the segment.

From the upper and lower edges of the segment, a belt, H, passes around the dasher-shaft B. A buckle, I, or other suitable device is employed for tightening and adjusting the belt. The belt is so attached to the dasher that, as the lever E is vibrated up and down, the dasher is raised and lowered, and, at the same time, is rotated, first in one direction and then in the other, upon its vertical axis. The dasher thus moving vertically through the cream, and, at the same time, turning on its axis, in order to obtain the full benefit of its action, it is necessary that it should be provided both with vertical dash-boards or beaters J J, and also with horizontal ones K K, the construction and connection of which are clearly shown in the drawings. The construction of this dasher and operating-apparatus is so simple that it can be made and attached to any old-fashioned churn at a trifling cost. Its operation by means of the lever E is much easier than that of other churns, as the lever, by a short stroke, agitates the cream more effectually than can be done in the usual way, by raising the dasher from the bottom to the top of the churn. It breaks the globules of the milk very rapidly, causing the butter to appear in less time than any other churns now in use.

Having thus described my invention, what I claim as new, and desire to secure by Letters Patent, is—

1. The combination of the lever E, segment F, belt H, vertical dasher-staff B, upright beaters J J, and horizontal beaters K K, when constructed and arranged to operate in the manner and for the purposes set forth.

2. The ventilators $c$ $c$, substantially as and for the purposes set forth.

J. W. THOMPSON.

Witnesses:
   GEO. W. SHIELDS,
   THEO. F. IRELAND.